Figure 1:
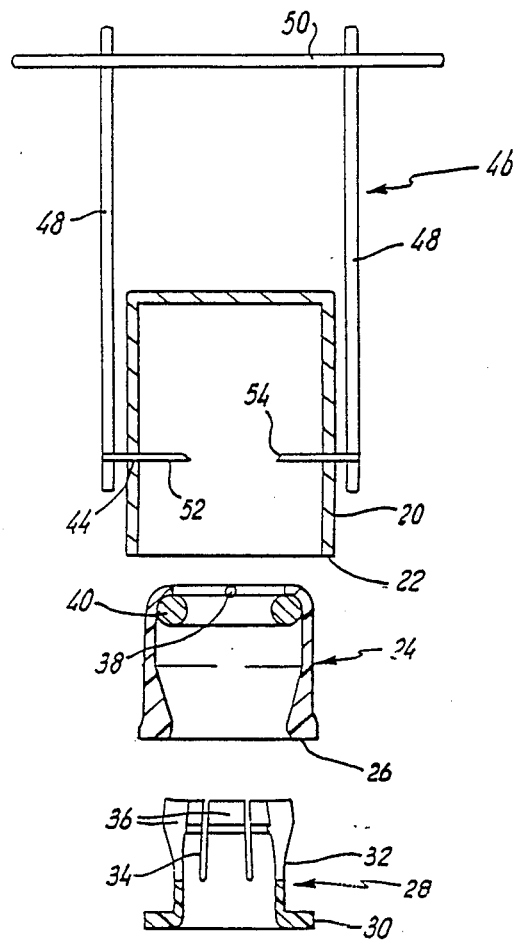

United States Patent [19]
Ford

[11] Patent Number: 4,762,144
[45] Date of Patent: Aug. 9, 1988

[54] VALVE COVER APPARATUS

[75] Inventor: John Ford, Hanley, England

[73] Assignee: Ford-Manwaring Limited, England

[21] Appl. No.: 26,545

[22] PCT Filed: Jun. 27, 1986

[86] PCT No.: PCT/GB86/00379
§ 371 Date: Feb. 27, 1987
§ 102(e) Date: Feb. 27, 1987

[87] PCT Pub. No.: WO87/00255
PCT Pub. Date: Jan. 15, 1987

[30] Foreign Application Priority Data
Jun. 29, 1985 [GB] United Kingdom ................ 8516505
Apr. 10, 1986 [GB] United Kingdom ................ 8608721

[51] Int. Cl.$^4$ ............................................. F16K 27/08
[52] U.S. Cl. .................................. 137/382.5; 137/377; 251/96
[58] Field of Search ..................... 251/96, 77; 137/377, 137/382, 382.5

[56] References Cited
U.S. PATENT DOCUMENTS
4,369,807 1/1983 Camp .................................. 137/382
4,549,716 10/1985 Warren ................................ 251/96
4,616,763 10/1986 Ruhl ................................... 137/382

Primary Examiner—A. Michael Chambers
Attorney, Agent, or Firm—W. Thad Adams, III

[57] ABSTRACT

A cover for a valve (10) has a housing (20) mounting internally a component (24), with a collet (28) being located with play through an open end of the component (24). Resiliently deformable jaws (36) of the collet (28) co-operate with a profiled inner wall of the component (24) for opening and closing of the jaws (36) upon axial movement of the collet (28) relative to the component (24). When positioned on a stem (12, 14) of the valve (10), the cover is movable downwardly thereon to operate the valve and is freely rotatable, but on movement upwardly the cover is clamped by closing of the jaws (36) on the stem (12, 14). The housing (20) is formed of a material with a high degree of resistance to vandalism.

9 Claims, 2 Drawing Sheets

VALVE COVER APPARATUS

This invention relates to apparatus for covering or shielding valves, and in particular is concerned with apparatus for shielding of valve stems of the type generally to be found in use with central heating radiators.

At the present time the valves of central heating radiators, whether or not they be of an adjustable type, generally have covers in the form of plastics caps which normally are either push fitted onto the valve stems or are secured by means of screws or the like engageable through apertures in the plastics caps into internally threaded ends of the valve stems. Such caps have been found to be easily damaged and very susceptible to vandalism. Removal of the caps exposes the valve stems and these can constitute a danger to safety, particularly in radiators in premises such as schools.

According to the present invention there is provided apparatus for covering valves, characterised in that the apparatus comprises means for releasably locating on a valve stem, the locating means comprising a first part, and a second part movably located on the first part, whereby, with the apparatus located on the valve stem, when the second part is in a first position relative to the first part, the apparatus is movable on the valve stem, and, when the second part moves to a second position relative to the first part, the second part clamps the appartus against movement on the valve stem, means being provided to deter unauthorised access to the locating means.

Preferably the means for deterring access comprises a housing within which the locating means is retained, the housing providing a skirt extending beyond the locating means for shielding thereof and of the valve stem. An aperture may be provided in the housing through which aperture can be inserted a tool for engaging with the second part of the locating means to move same to the first position within the first part, enabling movement of the apparatus from the valve stem. Alternatively an indication may be provided on an outer face of the housing identifying where an aperture should be formed to allow access of a tool therethrough.

Preferably also the first part has a valve operating member for engaging with a valve stem of an adjustable valve, the locating means normally being so positioned on the valve stem that the valve operating member is in an inoperative position, manual pressure requiring to be applied in the direction towards the valve stem to bring the valve operating member into operative engagement with the latter.

The first part of the locating means comprises a body having at least one open end, an inner wall of the body tapering inwardly towards the open end, and the second part comprises a collet mounting an adjustable section in the form of a plurality of resilient jaws, the latter being engageable through the open end of the body of the first part to co-operate with the inner wall thereof, and being adjustable between an outermost condition when the collet is in the first position, and an innermost condition when the collet is in the second position.

Alternatively, the first part of the locating means may comprise a body having at least one open end, and the second part may comprise a collet which is pivotally mounted at one end on the body to extend across the open end thereof, the collet being biassed from said first position extending substantially at right angles to the open end of the body into said second position extending angularly relative to the open end of the body, whereby in said second position the collet engages with a shoulder of the valve stem to clamp the apparatus thereto.

Figure 2:
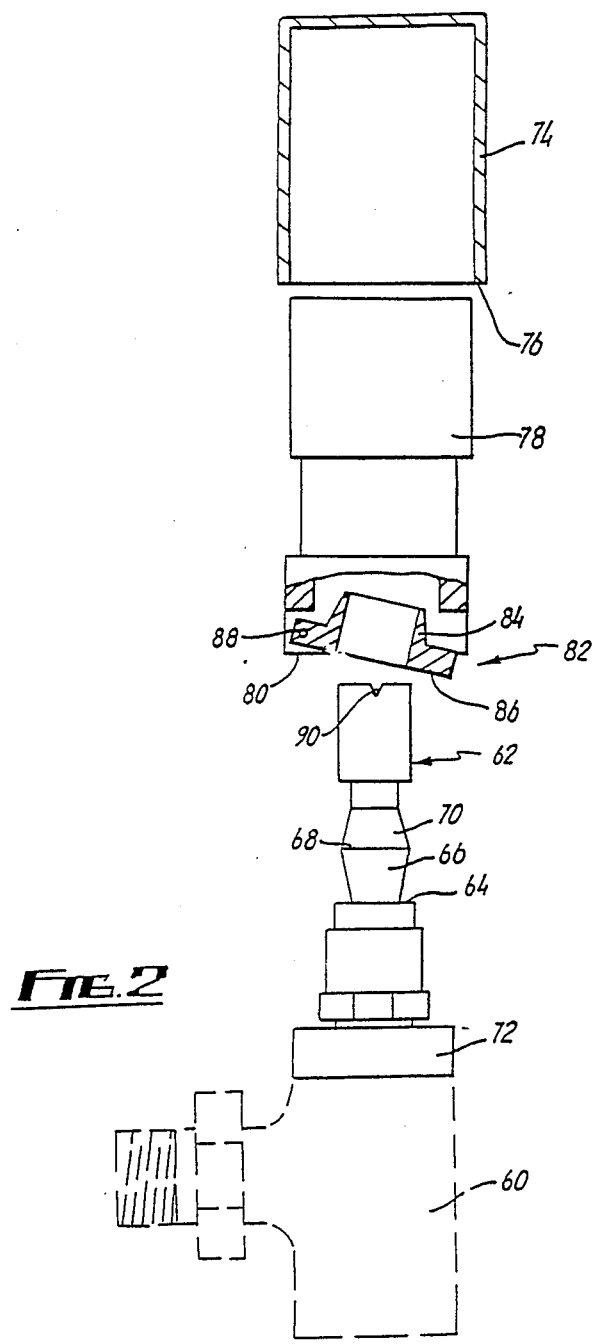

Embodiments of the present invention will now be described by way of example only with reference to the accompanying drawings, in which:

FIG. 1 is an exploded view in part section of an apparatus according to a first embodiment of the invention with a valve; and FIG. 2 is an exploded view in part section of an apparatus according to a second embodiment of the invention with a valve.

Referring to FIG. 1 of the drawings, a valve 10 of a conventional type used for example with a central heating radiator, has an upstanding valve stem 12. In this embodiment the valve 10 is considered to be an adjustable valve and, for a purpose hereinafter described, the valve stem 12 has located thereon an extension 14, preferably formed of stainless steel, having a notch 16 in its upper free end. A collar 18 is fitted to the valve 10 to have an outer periphery substantially flush with the outer periphery of a main body section of the valve 10.

A valve covering apparatus comprises a tubular housing 20 formed of a suitable hard wearing material to a high degree resistant to vandalism, the housing 20 being open at one end, the lower end 22 in use, and being closed at its upper end. Within the housing 20 adjacent the closed end thereof, there is provided an arrangement for locating on the valve stem 12 with its extension 14.

The locating arrangement comprises a first innermost component 24 of tubular configuration having at least one open end, the lower end 26 in use. The component 24 can be a push fit within the housing 20, or can be secured therein by any other suitable means such as adhesive. An inner wall of the component 24 tapers inwardly from a maximum diameter section adjacent the other end to a reduced diameter section adjacent the open end 26. A second component 28 in the form of a collet is formed by an annular collar 30 mounting a substantially tubular part 32 which is formed with axially extending slots 34 so as to define separate jaws 36. The components 24, 28 are preferably formed of a plastics material and the jaws 36 are formed to be resiliently deformable in a radially inward direction. The jaws 36 are so designed and dimensioned relative to the component 24 that the jaws 36 are resiliently deformed when they are inserted through the open end of the component 24. As the outer ends of the jaws 36, which in a non-deformed condition are of a diameter greater than the diameter of the tubular part adjacent to the collar 30, are moved past the outwardly tapering inner wall of the component 24, the jaws 36 can return to their normal condition, whereby to retain the component 28 with play within the component 24.

In use the valve covering apparatus is located over the valve stem 12 with the extension 14 until the component 28 locates over the extension 14. When the component 28 is within the component 24 with the collar 30 substantially adjacent the open end 26, the valve locating arrangement is movable on the extension 14 so that the valve covering apparatus can be easily mounted on the latter. When properly positioned, the lower end 22 of the housing 20 overlies the collar 18 on the valve 10 so as to substantially enclose the valve locating arrangement. A spring arrangement (not shown) may be provided to bias the collar 18 into position and further assist in preventing damage to the collar by vandalism.

When the valve covering apparatus is pushed to a lowermost position onto the valve 10, a valve operating member 38 extending substantially diametrically across the internal cavity of the component 24 can engage in the notch 16 in the upper end of the extension 14, so that rotation of the valve covering apparatus will rotate the valve stem 12 and adjust the valve 10 in a conventional manner. When manually applied pressure on the valve covering apparatus is released, the resilience of an O-ring 40, which is located in the component 24 and against which abut the free ends of the jaws 36, slightly lifts the component 24 with the housing 20 relative to the component 28 and removes the valve operating member 38 from the notch 16. In this condition, the housing 20 with the component 24 is freely rotatable on the component 28 and the valve extension 14 so as to prevent inadvertent operation of the valve 10.

Movement of the housing 20 in a direction to lift off the valve 10 creates relative movement between the components 24, 28. As the component 24 is raised relative to the component 28 the engagement between the inner wall of the component 24 and the resilient jaws 36 radially inwardly deforms the jaws 36, which clamp tightly against the valve extension 14 and prevent removal of the valve covering apparatus therefrom. One or more annular grooves 42 formed on the extension 14 assist in the clamping engagement between the component 28 and the valve extension 14. Removal of the valve covering apparatus is thereby prevented.

For authorised removal, there may be provided a pair of diametrically opposed through apertures 44 in the housing 20, whereby a tool 46 can locate in the apertures 44 to engage with a lower face of the collar 30 so as to raise the component 28 within the component 24 and thereby release the clamping action of the jaws 36. The tool 46 has a pair of legs 48 each with a hole at one end for slidable fitting on a support bar 50. At the other end each leg 48 has a projecting pin 52 with a profiled free end 54. The pins 52 are inserted in the apertures 44 and the legs 48 moved together on the bar 50 to correctly position the pins 52 via the profiled ends 54 and manually clamp the tool 46 to the housing 20. The valve covering apparatus can then be removed, for example for cleaning, servicing or repair of the valve 10. As an alternative to the provision of apertures in the housing 20, identifying marks (not shown) may be provided thereon, so that holes are only formed when it is necessary to remove the valve covering apparatus.

In a modification, the housing 20 may be integrally formed with an internal tubular part extending downwardly from the upper end thereof and centrally, whereby to provide an annular space between the tubular part and the inner peripheral wall of the housing 20. The component 24 can be fitted as before in the tubular part. A spring can be located in the annular space to bias the collar 18 downwardly into position and bias the housing 20 upwardly. The collar 18 may be formed internally of different wall thickness at respective ends, whereby the collar can be inverted in use to accommodate different sizes of valves.

Referring to FIG. 2 the drawings, a further embodiment of a valve covering apparatus is shown in use with a a valve 60 of a conventional type used for example with a central heating radiator, the valve 60 having an upstanding valve stem 62 profiled to have a part of reduced diameter defining, in an upward direction from a radial shoulder 64, a first section 66 gradually increasing in diameter upwardly to a second section 68 which then reduces gradually in diameter upwardly to an upper end section 70. A collar 72 is fitted to the valve 60 to have an outer periphery substantially flush with the outer periphery of a main body section of the valve 60.

A valve covering apparatus comprises a tubular housing 74 formed of a suitable hard wearing material to a high degree resistant to vandalism, the housing 74 being open at one end, the lower end 76 in use, and being closed at its upper end. Within the housing 74 adjacent the closed end thereof, there is provided an arrangement for locating on the valve stem 62. The arrangement can be a push fit within the housing 74 or can be secured therein by any other suitable means such as adhesive.

The locating arrangement comprises a first component 78 of tubular configuration having at least one open end, the lower end 80 in use. A second component in the form of a collet 82 is formed of a central tubular part 84 with diametrically opposed outwardly extending lugs 86. One of the lugs 86 has a through hole therein whereby a pivot pin 88 can extend therethrough and into corresponding apertures in the body of the component 78, complementary recesses being provided in the lower end 80 of the component 78 to receive the lugs 86 whereby, in one position, the collet 82 can lie across the open lower end 80 of the component 78, parallel to the open end with the cylindrical part 80 extending into the component 78. The collet 82 is suitably biassed internally of the component 78 downwardly into a second pivoted or angled position relative to the open end 80 for a purpose hereinafter described.

In use the valve covering apparatus is located over the valve stem 62 which passes through the tubular part 84 into the component 78. The latter is designed internally to coaxially position on the stem 62 whereby the stem 62 deflects the collet 82 into said one position thereof which is required to enable the stem 62 to pass through the collet 82, as the major diameter of the first section 66 of the stem 62 is dimensioned to pass through the collet 82 with little play. As the stem 62 passes into the collet 82 the latter can move back to its second or angled position under the biasing force over the reducing diameter area of the first section 66, and the inner end of the part 84 engages against the shoulder 64 on the stem 62. When properly positioned the lower end 76 of the housing 74 overlies the collar 72 on the valve 69 so as to substantially enclose the valve locating arrangement.

When the valve covering apparatus is pushed to a lower-most position onto the valve 60, a valve operating member (not shown) in the component 78 can engage in a notch 90 in the upper end of the valve stem 62 so that rotation of the valve covering apparatus will rotate the valve stem 62 and adjust the valve 60 in a conventional manner. When manually applied pressure on the valve covering apparatus is released, the biassing of the collet 82 lifts the component 78 with the housing 74 and removes the valve operating member from the notch 90, the collet 82 then being in its angled position relative to the component 78. In this condition the housing 74 with the component 78 is freely rotatable on the valve stem 62 so as to prevent inadvertent operation of the valve 60.

Movement of the housing 74 in a direction to lift off the valve 60 is prevented by the engagement between the collet 82 when in its angled position and the shoulder 64 of the stem 62.

For authorised removal, there may be provided a through aperture (not shown) in the housing 74, whereby a tool (not shown) which can have a unique design, can be inserted through the aperture to engage with a lower face of the collet 82 so as to raise the latter to its first or horizontal position and thereby release the clamping action of the collet 82 on the valve stem 62. The valve covering apparatus can then be removed, for example for cleaning, servicing or repair of the valve 60. As an alternative to the provision of an aperture in the housing 74, an identifying mark (not shown) may be provided thereon, so that a hole is only formed when it is necessary to remove the valve covering apparatus.

It will be appreciated that each embodiment therefore provide an apparatus which cannot be manually be removed from the valve and which is not removable even with the use of a conventional tool. Further the valve housing in its normal condition is not rotatably fixed so that it cannot be damaged even by unauthorised rotation in either direction. Pressing of the apparatus into an operative condition will not lead to damage in that continued rotation of the housing beyond the limit of movement of the valve stem will cause the apparatus to move out of operative engagement with the valve stem and the housing will again be free to rotate.

The valve cover apparatus of the first embodiment is designed more particularly for use with valves of existing central heating radiators. It is envisaged that when radiators are replaced the valves may be designed to incorporate a valve cover more particularly of the type described in the second embodiment.

It is also to be appreciated that the apparatus may be used with a valve of a non-adjustable type. In this event a valve extension may not be necessary although it can be provided if it is necessary, to lengthen the valve stem. Further, the valve operating member will not be required, but in all other respects the apparatus remains the same as previously described.

For a radiator balance valve, the valve shaft may be extended and a valve covering apparatus as described can be provided and secured in position once the valve has been balanced. The valve is thus protected to prevent tampering with the balance of the central heating system. A hole can be drilled in the shaft extension and a hole provided in the valve cover housing, whereby the holes when aligned can receive a pin to rotate the valve shaft when adjustment of the valve balance is required.

Various modifications may be made without departing from the invention. For example the locating arrangement may be other than that described and shown provided it functions in the way required. Also for valves with longer stems, an extension part may be provided for the collar to ensure adequate overlap between the housing and the collar.

I claim:

1. Apparatus for covering valves, wherein the apparatus comprises means for releasably locating on a valve stem, the locating means comprising a first part, and a second part movably located on the first part, whereby, with the apparatus located on the valve stem, the apparatus is movable from a non-operative condition, when the second part is in a first position relative to the first part, and the first and second parts are movable relative to the valve stem, to enable free movement of the apparatus in either direction of rotation relative to the valve stem, in one direction of movement to an operative condition wherein engagement with the valve stem can operate the valve, movement of the apparatus from the non-operative condition in an opposed direction of movement causing the second part to move to a second position relative to the first part, the second part clamping against the valve stem to prevent unauthorised removal of the apparatus from the valve, means being provided to deter unauthorised access to the locating means.

2. Apparatus according to claim 1 wherein the means for deterring access comprises a housing within which the locating means is retained, the housing providing a skirt extending beyond the locating means for shielding thereof and of the valve stem.

3. Apparatus according to claim 2, wherein the first part of the locating means is secured within the housing.

4. Apparatus according to claim 2 or 3, wherein apertures are provided in the housing through which apertures can be inserted a tool for engaging with the second part of the locating means to move same to the first position within the first part, enabling movement of the apparatus in said opposed direction and removal of the apparatus from the valve stem.

5. Apparatus according to claim 2 or 3, wherein an indication is provided on an outer face of the housing identifying where an aperture should be formed to allow access of a tool therethrough.

6. Apparatus according to any of claims 1, 2 or 3, wherein the first part has a valve operating member for engaging with a valve stem of an adjustable valve, manual pressure requiring to be applied in said one direction towards the valve stem to bring the valve operating member into operative engagement with the latter.

7. Apparatus according to any of claims 1, 2 or 3, wherein the first part of the locating means comprises a body having at least one open end, an inner wall of the body tapering inwardly towards the open end, and the second part comprises a collet mounting an adjustable section in the form of a plurality of resilient jaws, the latter being engageable through the open end of the body of the first part to co-operate with the inner wall thereof, and being adjustable between an outermost condition when the collet is in the first position, and an innermost condition when the collet is in the second position.

8. Apparatus according to any of claims 1, 2 or 3, wherein the first part of the locating means comprises a body having at least one open end, and the second part comprises a collet which is pivotally mounted at one end on the body to extend across the open end thereof, the collet being biassed from said first position extending substantially at right angles to the open end of the body into said second position extending angularly relative to the open end of the body, whereby in said second position the collet engages with a shoulder of the valve stem to clamp the apparatus thereto.

9. A valve assembly comprising a valve having a stem and a valve covering apparatus according to claim 1 releasably mounted on the stem.

* * * * *